United States Patent
Fender et al.

(10) Patent No.: US 8,498,895 B2
(45) Date of Patent: Jul. 30, 2013

(54) BROWSER BASED USER IDENTIFICATION

(75) Inventors: Miles Laurence Fender, Kenwood, CA (US); Murray Todd Williams, New York, NY (US)

(73) Assignee: Accenture Global Services Limited, Dublin (IE)

(*) Notice: Subject to any disclaimer, the term of this patent is extended or adjusted under 35 U.S.C. 154(b) by 333 days.

(21) Appl. No.: 12/838,814

(22) Filed: Jul. 19, 2010

(65) Prior Publication Data

US 2012/0016836 A1    Jan. 19, 2012

(51) Int. Cl.
*G06Q 30/00*    (2012.01)

(52) U.S. Cl.
USPC ........................................................ 705/14.1

(58) Field of Classification Search
USPC ........................................................ 705/14.1
See application file for complete search history.

(56) References Cited

U.S. PATENT DOCUMENTS

| | | |
|---|---|---|
| 6,760,912 B1 | 7/2004 | Yarsa et al. |
| 7,519,954 B1 | 4/2009 | Beddoe et al. |
| 2002/0078141 A1 | 6/2002 | Cohen et al. |
| 2002/0112013 A1 | 8/2002 | Walsh |
| 2003/0217039 A1 | 11/2003 | Kurtz et al. |
| 2008/0293379 A1 | 11/2008 | Hinton et al. |
| 2009/0328144 A1 | 12/2009 | Sherlock et al. |
| 2010/0100419 A1 | 4/2010 | Natoli et al. |
| 2010/0131835 A1* | 5/2010 | Kumar et al. ................. 715/205 |

OTHER PUBLICATIONS

"Help EFF Research Web Browser Tracking" Electronic Frontier Foundation, downloaded Feb. 25, 2010.
Eckersley, P. "How Unique Is Your Web Browser", Electronic Frontier Foundation, Jun. 17, 2010, 19 pages.

* cited by examiner

*Primary Examiner* — Daniel Lastra
(74) *Attorney, Agent, or Firm* — Mannava & Kang, P.C.

(57) ABSTRACT

An online behavior tracking system includes a unique ID module configured to determine attributes of a user device, and calculate a unique ID for a user from the attributes. The unique ID is used to track online behavior for the user across different domains. Also, the online behavior tracking system is used in a content evaluation system which delivers content treatments to users and tracks online behavior of the users in response to the delivered treatments.

17 Claims, 5 Drawing Sheets

BROWSER BASED USER IDENTIFICATION

BACKGROUND

Today, website visitors are mostly identified via cookies containing a unique ID. A cookie is text (e.g., a name-value pair) stored on a user device by a web browser. The cookie is initially sent to the browser from a web server. The cookie is saved on the user device by the browser. Then, the cookie may be sent back to the web server, unchanged, from the browser each time the browser accesses the website on the web server. A cookie is commonly used for authentication, storing site preferences, storing shopping cart contents, and tracking.

For example, in the case of a shopping cart, a web server sends a cookie containing a unique session ID. The browser sends back that session ID and an indication of items placed in the shopping cart by the user. The web server stores the items with the session ID. The user may leave the website without checking out the items in the shopping cart. If the user returns to the web site, the browser sends the cookie to the web server. Then, the web server can retrieve the items in the shopping cart associated with the cookie and previous session ID, and these items may be displayed to the user. In the case of tracking, every time a page from a website is requested, the web server stores the uniform resource locator (URL) of the requested page, the date and time of the request, and the cookie in a log file so a list of accessed pages and sequence of accessing pages can be determined for each cookie.

While the use of cookies is a universally accepted practice, there are limitations. According to the standard for cookies promulgated by the Internet Engineering Task Force (IETF) (i.e., RFC2109), cookies are sent only to the server setting them or to the server in the same Internet domain. For example, an online shopping website at abc.com may install a cookie on a user device, such as a user's laptop or cell phone. However, the online shopping website may send a user to a product manufacturer's website yyy.com in a different domain (which is identified by a different domain name) after the user has selected the product from the online shopping website. The website yyy.com can no longer use the cookie installed on the user device by abc.com because yyy.com is in a different domain. This may be a problem if yyy.com wants to maintain user settings or preferences or shopping cart items associated with the cookie sent by abc.com. Another limitation of cookies is that some users block cookies, especially third party cookies, due to privacy concerns. Also, increasingly browsers are treating cookies as 'session cookies', which may be deleted after the browser is closed, regardless of whether the cookies have been defined with a specific expiration date. Thus, cookies may not be usable for tracking across different domains, maintaining user preferences across different domains, and maintaining shopping cart items across different domains.

SUMMARY

A system configured to provide content for evaluation includes a treatment generator configured to generate a treatment including at least one variable component and configured to provide the treatment to a user device visiting a web site. A unique ID module is configured to determine attributes of the user device, and calculate a unique ID for a user from the attributes. An online behavior capture module is configured to capture online behavior of the user in response to providing the treatment to the user device and is configured to associate the captured online behavior with the unique ID. One or more of the modules may be executed by a computer system.

An online behavior tracking system includes a unique ID module running on a computer system and configured to determine attributes of a user device, and calculate a unique ID for a user from the attributes. An online behavior tracker is configured to determine whether the unique ID is associated with captured online behavior and the online behavior tracker is configured to store the captured online behavior with the unique ID in response to determining the unique ID is associated with the captured online behavior. The online behavior tracker is configured to determine whether the unique ID is associated with captured online behavior by determining a second unique ID for the captured online behavior from attributes of a user device performing the captured online behavior, and determining whether the second ID matches the unique ID calculated by the unique ID module.

A non-transitory computer readable medium stores one or more computer programs including instructions that when executed by a computer system perform a method of determining a unique ID for an online user. The method comprises determining attributes of a user device; calculating, by a computer system, a unique ID for a user from the attributes; and using the unique ID to track the user's visits to websites in different domains.

BRIEF DESCRIPTION OF DRAWINGS

The embodiments of the invention will be described in detail in the following description with reference to the following figures.

DETAILED DESCRIPTION OF EMBODIMENTS

Figure 1:
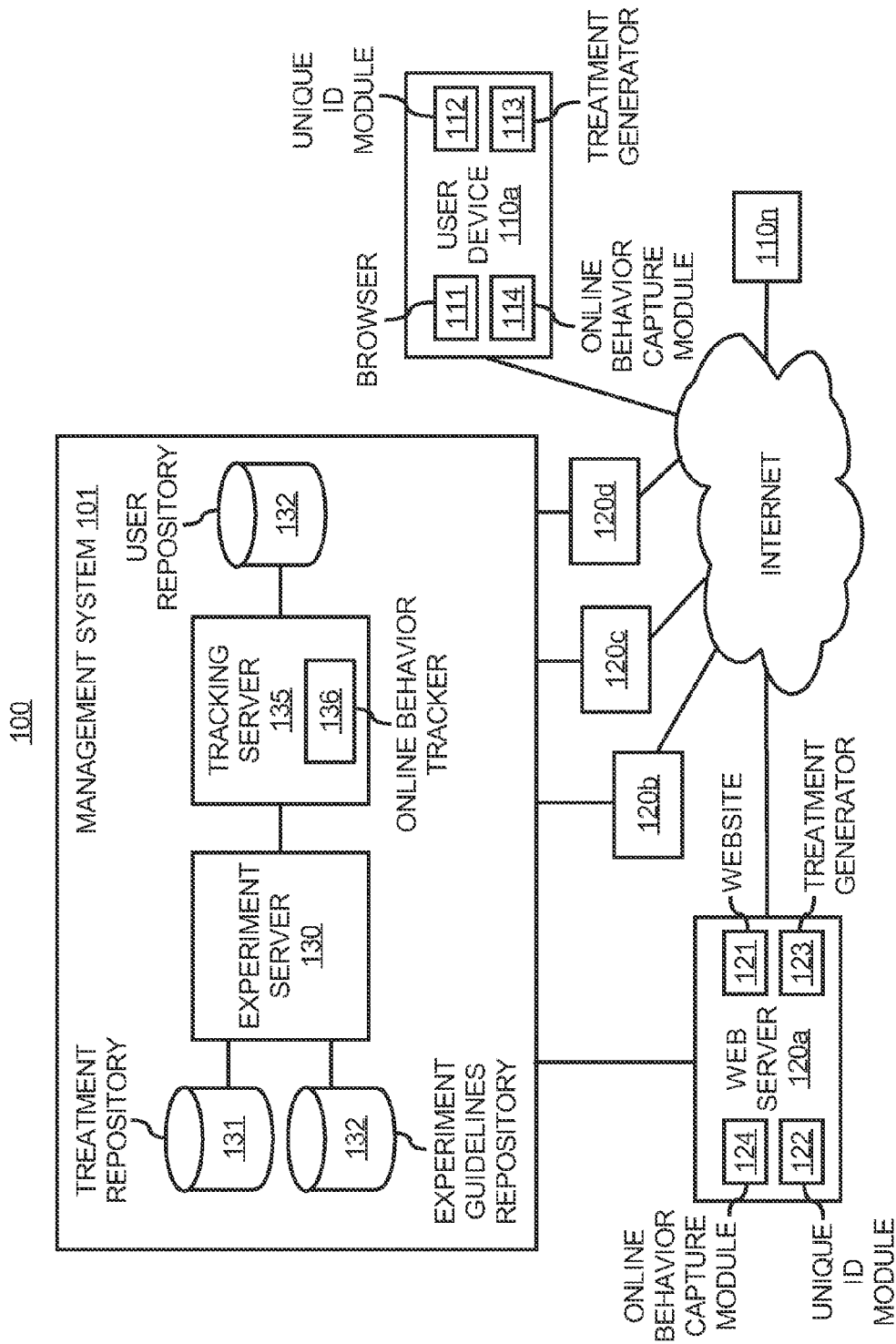
FIG. 1 illustrates a system, according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments. Furthermore, different embodiments are described below. The embodiments may be used or performed together in different combinations.

According to an embodiment, attributes of a browser running on a user device are used as input to an ID function to calculate a unique ID for a user. This unique ID is used to track the user. The user device attributes are not limited to the attributes for the browser, but may include other types of attributes of the user device. For example, the attributes of the user device may include attributes of software other than the browser, such as operating system (OS) attributes (e.g., version), location attributes of the user device, (e.g., IP address, zip code, etc.) and, physical attributes of the user device (e.g., display monitor resolution such as height and width), etc. Examples of browser attributes include browser name, version of the browser, plug-ins for the browser, etc.

In one embodiment, when a browser accesses a web page, a string including the attributes is passed to a web server hosting the web page. This string may be an alphanumeric string. The string is converted into a numeric value. For example, ASCII values are used to convert characters to numeric values. The string of numeric values are input to the ID function to calculate the unique ID for the user. The ID function may be a conventional hash function.

After the unique ID is determined, it is stored, for example, in a database. Then, each time a user visits a web site, a unique ID is calculated for the user and matched with a unique ID in the database. Then, online behavior can be stored for the matching unique ID in the database. Thus, the user can be tracked across different domains using the unique ID. A domain may include a web server or set of computers identified by a domain name.

In one embodiment, the attributes used to calculate the unique ID are divided into groups. A string for each group is input to the ID function to determine an ID value for each group. Then, an exact match is not needed when matching a calculated ID for a user with an ID stored in the database. If most of the groups in the calculated ID match a stored ID then it would be considered the same user (i.e., a match). For example, a user may use two different browsers to access web sites on the Internet. If attributes for two different browsers are being identified, but the IP and the OS and other attributes are the same, then online behavior, such as accessing different web sites, may be considered to be by the same user and is stored as being for the same user. In another embodiment, a range is used for matching. For example, if an IP address is a value you hash on, the value may be dynamic but within a range. Then, you can match within the range. Cookies do not provide this ability because they are limited to an initial value sent to the user by the web server.

In one embodiment, the unique ID generated from the attributes is used to assign users to a specific experimental group for online multivariate testing. For online multivariate testing, different treatments are tested by presenting each treatment to a group of users when they access a web site. A treatment for online multivariate testing is content that is presentable online to a user but has one or more features that can be varied so different variations of the treatment can be tested. The treatment may include an online advertisement or a web page or any component of a web page that has one or more attributes, such as color, size, shape, location, text, etc., that can be varied. The treatment is presented to the users. Then, their actions, in response to the treatment, are tracked using the IDs generated from their browser attributes and possibly other user device attributes. The captured actions may be used to determine the effectiveness of different treatments.

A specific treatment may be assigned to a user randomly in order to assure that possible experimental variations are allocated evenly across all the users in the experimental group. The ID may also be used for randomly assigning treatments to users. For example, the ID calculated using the attributes and the ID function is used to select a variation of the treatment to provide to the user. The calculated ID value may be a hash value if the ID function is a hash function. Selection of the treatment may include taking the hash value, which may be a large integer, and computing an arithmetic modulus of the total number of experimental variations. Specifically, if h is the computed hash value computed from the user's browser attributes and other attributes, and if n is the total number of experimental treatments in the statistical multivariate experiment, then the assigned treatment number is equal to h mod n, whereby each treatment is previously assigned a treatment number. For example, in an experiment with 64 potential treatments, a mod 64 calculation on the hash value could determine which of the 64 treatments to present to a user. This speeds the process of selecting and presenting treatments to users for the experiment. Also, creating a hash value in real time from browser data in this way removes the need to send a cookie to the user device. This eliminates cross-domain issues and opens the possibility of testing on users who traditionally refuse cookies.

FIG. 1 illustrates a system 100 according to an embodiment that may be used for content evaluation. The system 100 includes a management system 101, web servers 120a-d, and user devices 110a-n connected to the web servers 120a-d via the Internet. The user devices 110a-n include computer systems configured to access web sites on the Internet. The user devices may include end user devices, such as personal computers, cellular phones, personal digital assistants, etc., that are operable to surf the Internet. The user devices 110a-n may each include a browser for surfing the Internet. Browser 111 is shown for the user device 110a.

The management system 101 includes experiment server 130 and tracking server 135. Although, the experiment server 130 and the tracking server 135 are shown as two different servers, the functions of each may be performed by a single server or computer system. Similarly, multiple data repositories are shown in the management system 101, but the repositories may be provided in a single data storage system or multiple data storage systems. A data storage system may include a database or other conventional storage systems.

The experiment server 130 creates online multivariate experiments including treatments to be tested online. A treatment repository 131 stores treatments for testing. As described above, a treatment for online multivariate testing may include content that is presentable online to a user, such as through a web site on the Internet, but has one or more features that can be varied so different variations of the treatment can be tested. For example, a treatment is varied and variations of the treatment are tested by presenting each variation to a group of users when they access a web site. Examples of attributes that can be varied to create different treatments to be tested for an on-line retailer of merchandise may include different images of various goods offered by the retailer, different textual descriptions and price quotes for each good, different detailed information about on-line ordering, different graphics or animation to capture a user's attention, different colors, etc. Treatments may include textual listings or directories for various areas of interest, icons (interactive or non-interactive), images of products, hyperlinks to other websites, banner advertisements, etc. The arrangement of the content in a treatment or features of the content may be varied for testing.

An experiment guidelines repository 132 stores guidelines for experiments. Guidelines for an experiment may identify a treatment or group of treatments to be tested, and may identify variations of one or more features of the treatments. The guidelines may describe who to provide the treatments to and when to provide the treatments. For example, the guidelines may include demographics for a group or multiple groups that are to be presented with the treatments. The guidelines may identify when to deliver treatments for testing. The guidelines and treatments may be provided by users of the management system 101 that have treatments to be tested.

A tracking server 135 receives captured online behavior resulting from running experiments. The captured online behavior, for example, includes behavior resulting from presenting treatments to users 110*a-n*. The captured online behavior may include click-throughs, whether a purchase was made online in response to a treatment, tracking of a user through different web sites in response to a treatment, etc. The captured online behavior is stored in a user repository 133 along with unique IDs for users and experiments. For example, an experiment is assigned an ID when it is created. Also, IDs for users are generated from user device attributes, as is further described below. Captured online behavior is associated with a user ID for a user performing the behavior. The captured online behavior may also be associated with an experiment ID if it is in response to running an online, multivariate experiment. The tracking server 135 may include an online behavior tracker 136 that associates captured online behavior with a user ID and/or an experiment ID for storing the captured online behavior and associated ID(s) in the user repository 133.

The experiment server 130 is also configured to analyze captured online behavior for an experiment and provide the analysis to a user of the management system 101. The analysis may include identifying all the captured online behavior for a user, and identifying how effective each treatment variation was in eliciting certain user responses. For example, the analysis may indicate how often purchases or some other actions were elicited for each treatment. Other more sophisticated analytics and statistical processing may also be performed.

The web server 120*a* hosts a web site 121 that may be accessed by a browsers as is known in the art. Details of only web server 120*a* are shown, but each of the web servers 120*a-d* may include the same or similar components. Similarly, details of only user device 110*a* are shown, but each of the user devices 110*a-n* may include the same or similar components. Also, the number of web servers and user devices may be different than shown.

The web server 120*a* includes unique ID module 122, treatment generator 123, and online behavior capture module 124. A module may be software, hardware or a combination of hardware and software. The unique ID module 122 determines a unique ID for any user accessing the web site 121 based on attributes of a user device for each user. For example, the user device 110*a* accesses web site 121. The user device 110*a* sends its attributes to the web site 121 via the browser 111. The unique ID module 122 calculates a unique ID for a user of the user device 110*a* using an ID function and the attributes as input to the ID function. The user device attributes may be browser attributes, hardware attributes, OS attributes, etc. The unique ID module 122 stores the unique ID in data storage for the web server 120*a* and sends the unique ID to the tracking server 135 for storage in the user repository 133. Generation of the unique ID is described in further detail below.

The experiment server 130 may send a treatment and experiment guidelines for an online multivariate experiment to the web server 120*a*. The treatment generator 123 in the web server 120*a* delivers the treatment to the user devices 110*a-n* through the web site 121 in accordance with the guidelines. The guidelines, for example, specify one or more variations for a treatment to create different treatments, and when and to whom to deliver the treatment. The user device 110*a* accesses the web site 121 and a variation of the treatment is delivered to the browser 111 at the specified time in accordance with the guidelines. Similarly, treatment variations may be presented to other user devices 110*b-n* if they access the web site 121.

The online behavior capture module 124 captures the online behavior of the users that were delivered the treatments. The captured user behavior includes behavior captured on the web site 121 in response to the treatment presented to the user via, for example, the browser 111. The online behavior capture module 124 sends the captured online behavior along with the calculated user ID for the user performing the behavior and an experiment ID to the tracking server 135 in the management system 101. The information is stored in the user repository 133 at the management system 101. This information is stored for each user presented with the treatment.

In one embodiment, the user device 110*a* includes one or more of a unique ID module 112, treatment generator 113, and an online behavior capture module 114. Although not shown, each of the user devices 110*a-n* may include these components. These modules perform the same or similar functions as the unique ID module 122, the treatment generator 123, and the online behavior capture module 124. For example, the unique ID module 112 calculates the user ID using the unique ID function and the user device attributes and sends the unique ID to the web server 120*a* along with online user behavior captured by the online behavior capture module 114. In this case, the web server 120*a* need not calculate the user ID. Also, the web server 120*a* may include scripts in the web site distributed to the browser 111. The scripts are used by the treatment generator 113 to vary treatments in accordance with experiment guidelines. The treatment generator 113 at the user device 110*a* then varies the treatment in the web site by running the scripts. In this case, the web server 120*a* need not send varied treatments.

Although not shown, in yet another embodiment, the management system 101 delivers treatments for the experiments to the user devices 110*a-n* instead of delivering the treatments to the web servers 120*a-d*. Then, online behavior responsive to the treatments may be captured by the user device 110*a* and/or web sites and sent to the tracking server 135 in the management system 101. The tracking server 135 stores the online behavior in the user repository 133 with associated IDs.

Figure 2:
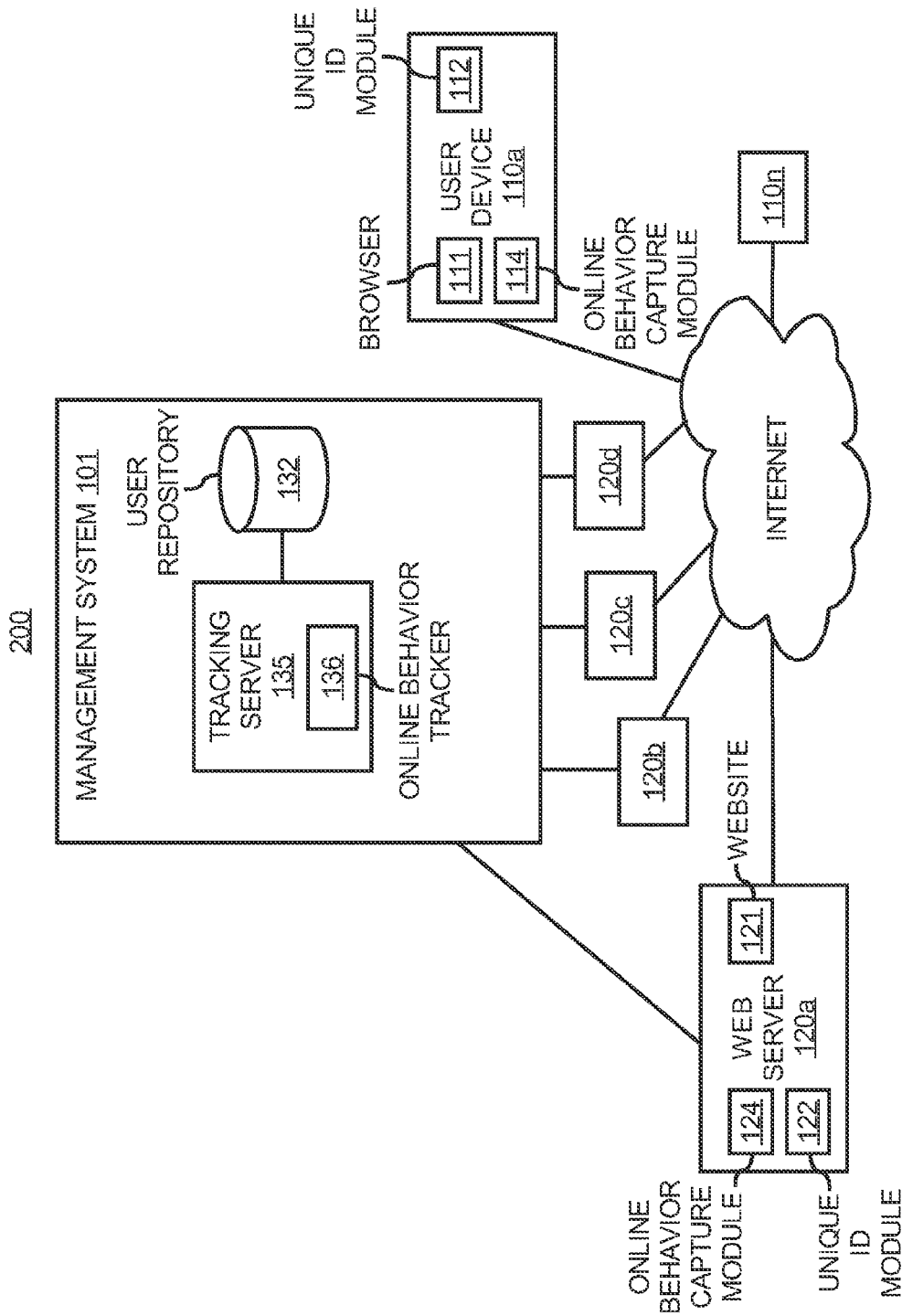
FIG. 2 illustrates another system, according to an embodiment.

The system 100 shown in FIG. 1 may be used generally for tracking online behavior of users across different domains. The system 100 is not limited to tracking online behavior in response to treatments provided to users. FIG. 2 shows an online tracking system 200 that is generally the same as the system 100 shown in FIG. 1. However, the system 200 may not include experiment server 130, treatment repository 131, experiment guidelines repository 132, and treatment generators 113 and 123. The system 200 includes the other components of the system 100, and thus may be used to track online behavior of a user by matching the unique ID associated with captured online behavior of the user with a unique ID of the user stored in the management system 101.

Figure 3:
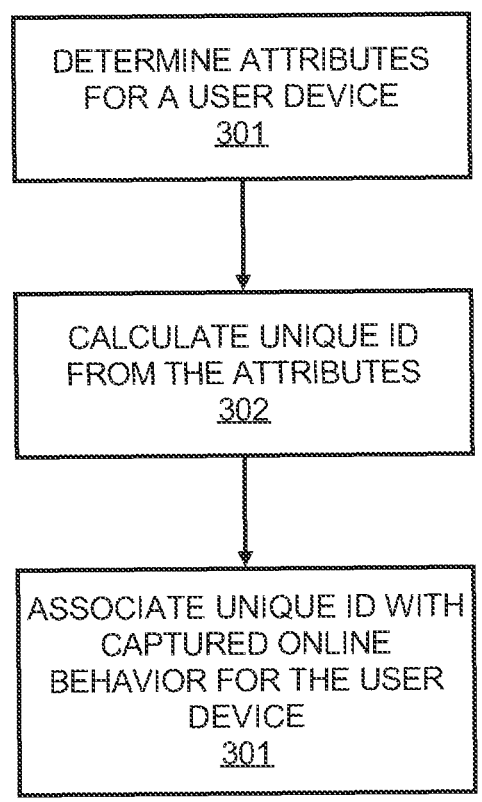
FIG. 3 illustrates a method for determining a unique ID of a user, according to an embodiment.

FIG. 3 illustrates a method 300 for determining a unique ID for an online user, according to an embodiment. The method 300 and other methods described herein may be described with respect to the systems 100 and 200 shown in FIGS. 1 and 2 by way of example and not limitation. The methods and functions described herein may be used with other systems.

At step 301, attributes are determined for a user device. The attributes may include attributes for the browser 111 (e.g., browser name, version of the browser, plug-ins for the browser). The attributes may include OS attributes (e.g., version), attributes of the user that can be determined (e.g., location of the user device, IP address, or user profiles for the user of the user device), physical attributes of the user device (e.g., display monitor resolution such as height and width), etc. In one example, the unique ID module 112a determines the attributes through application program interfaces or by accessing files that store the attributes.

At step 302, a unique ID is calculated from the attributes. For example, the unique ID module 112 uses an ID function to calculate the unique ID. In one example, the ID function is a hash function, and may be a one-way hash function. The attributes are hashed to determine the unique ID. In another example, the attributes are divided into groups. For example, the browser attributes are one group, device attributes are another group, OS attributes are another group. Attributes for each group are hashed. Then, the hash values for each group are concatenated in a predetermined order. Concatenating may include providing the hash value for a group at the end of a previous hash value for a previous group (e.g., hash 1, hash 2, hash 3 . . . ).

At step 303, the unique ID is associated with captured online behavior for the user device 110a. For example, the online behavior module 114 captures the online behavior of a user of the user device 110a. The captured online behavior may include click-throughs, online purchases, tracking of a user through different web sites, etc. The tracking of the user includes tracking of the user through different domains. The unique ID and the associated online behavior may then be sent to the management system 101.

The steps of the method 300 may also be performed at the web servers 120a-d or the management system 100, such as described above.

Figure 4:
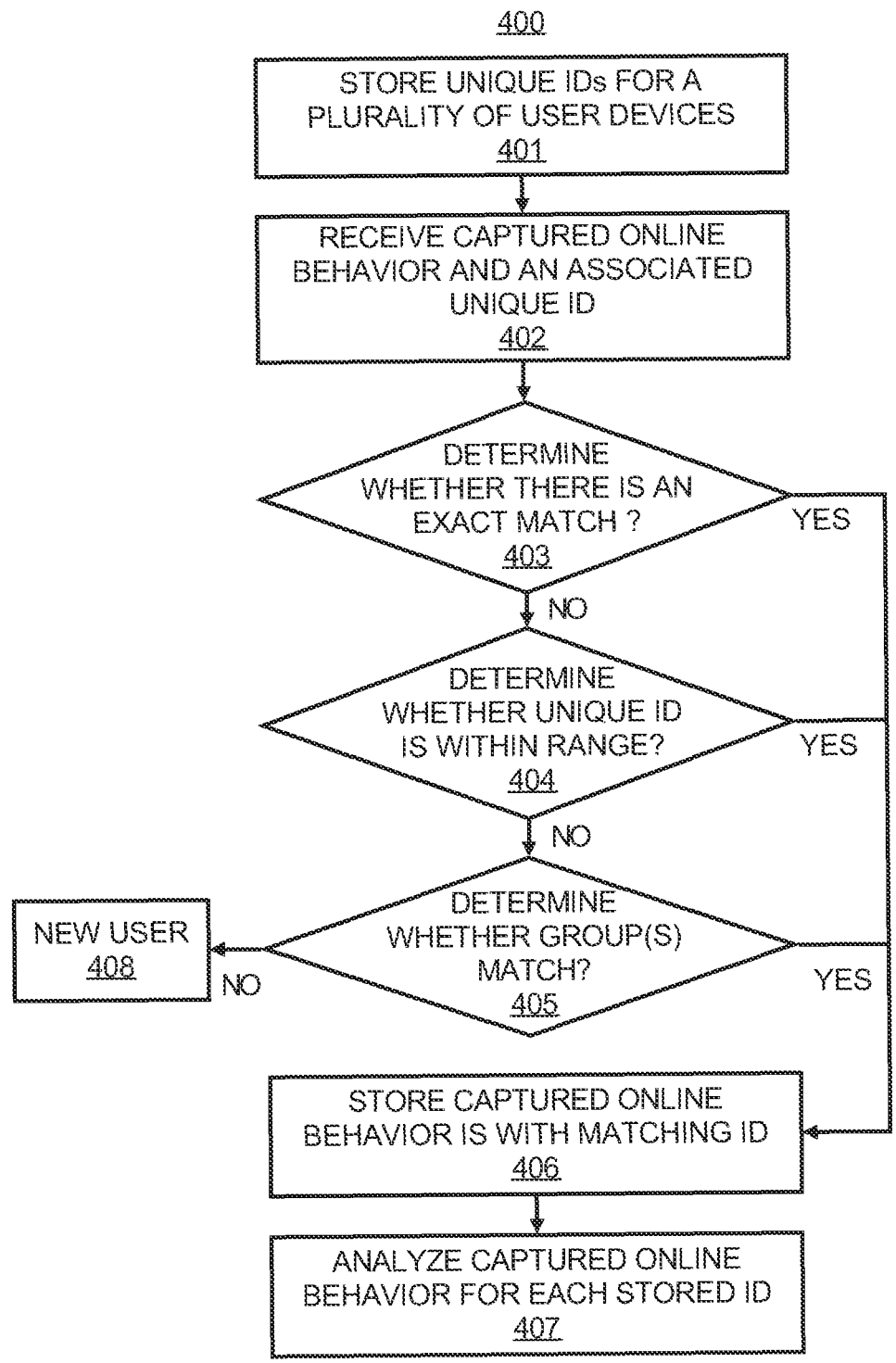
FIG. 4 illustrates a method for associating captured online behavior with a user, according to an embodiment.

FIG. 4 illustrates a method 400 for tracking online behavior of user's according to an embodiment. At step 401, unique IDs for a plurality of user devices are stored. For example, unique IDs for the user devices 110a-n, which are calculated using attributes such as described above with respect to step 302, are stored in the user repository 133 in the management system 101.

At step 402, captured online behavior and an associated unique ID, for example, from the user device 110a, are received at the management system 101. The captured online behavior and may be sent to the management system 101 from the user devices 110a-n and/or the web servers 120a-d.

At steps 403-405, the management system 101 determines whether the wherein the received unique ID matches a stored unique ID. The matching may include determining whether there is an exact match, which is performed at step 403. If there is not an exact match, the matching may include determining whether the received unique ID is within a range of a stored unique ID at step 404. If the unique ID is not within a range, the matching includes determining whether hash values for one or more groups of attributes for the received ID matches one or more groups of hash values for a stored ID at step 405. For example, the unique ID constitutes 3 hash values for 3 groups of attributes for the user device 110a. The first group may be physical device attributes, the second group may be software attributes (e.g., browser and OS), and the third may be location attributes. If at least 2 of the hash values for 2 groups match hash values for 2 groups of a stored ID, then the unique ID is considered a match for the stored ID and is considered to be the unique ID for the same user. Note that the 403-405 and other steps described herein may be performed in a different order than shown.

At step 406, if there is a match identified in any of steps 403-405, then the captured online behavior is stored with the matching ID. If no match is identified in steps 403-405, then the captured online behavior is considered to be for a new user, at step 408, and is stored in the user repository 133 under the unique ID sent with the captured online behavior.

At step 407, the captured online behavior for each stored ID is analyzed. The captured online behavior may identify the web sites visited and time and date stamps for each visit. The time-ordered sequence of web sites visited by each user, across different domains, may then be determined. Also, the captured online behavior may include other actions (e.g., buttons or ads click-on, online purchases, etc.) and time and date stamps for each action. This information is may be analyzed for various purposes. For example, the analysis may be performed to determine the effectiveness of a treatment if the captured online behavior is for a delivered treatment, such as described with respect to FIG. 1. The captured online behavior may be analyzed to determine use patterns to determine how to optimize web sites to improve hits or to improve sales. The captured online behavior may be analyzed for other reasons as well.

One or more of the steps and functions described herein and one or more of the components of the systems described herein may be implemented as computer code stored on a computer readable storage device, such as memory or another type of storage device. The computer code is executed on a computer system, for example, by a processor, application-specific integrated circuit (ASIC), or other type of circuit. The code may exist as software program(s) comprised of program instructions in source code, object code, executable code or other formats.

Figure 5:
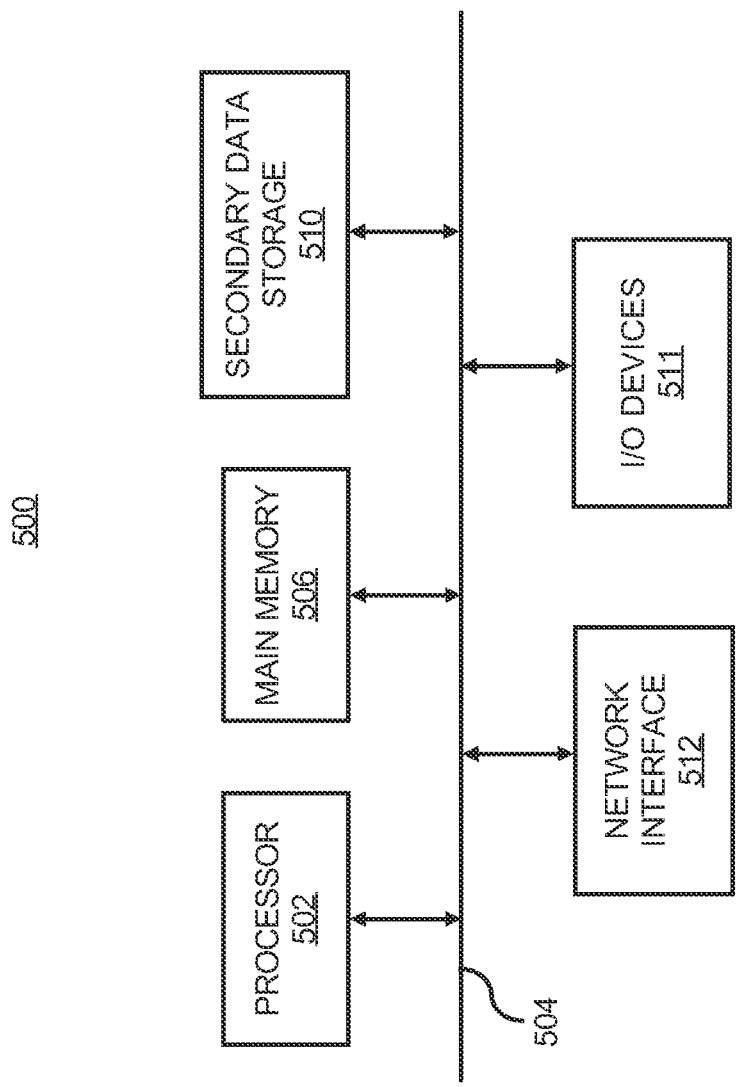
FIG. 5 illustrates a computer system configured to provide a hardware platform for the system shown in FIGS. 1 and 2, according to an embodiment.

FIG. 5 shows a computer system 500 that may be used as a hardware platform for the systems 100 and 200. The computer system 500 may be used as a platform for executing one or more of the steps, methods, and functions described herein that may be embodied as software stored on one or more computer readable storage devices, which are hardware storage devices.

The computer system 500 includes a processor 502 or processing circuitry that may implement or execute software instructions performing some or all of the methods, functions and other steps described herein. Commands and data from the processor 502 are communicated over a communication bus 504. The computer system 500 also includes a main memory 506, such as random access memory (RAM), where the software and data for processor 502 may reside during runtime. Secondary data storage 510 may include non-volatile data storage storing programs, data and any other information. The computer system 500 may include a network interface 505 for connecting to a network. It will be apparent to one of ordinary skill in the art that other known electronic components may be added or substituted in the computer system 500.

While the embodiments have been described with reference to examples, those skilled in the art will be able to make various modifications to the described embodiments without departing from the scope of the claimed embodiments. Furthermore, the system 100 shown in FIG. 1 is generally described with respect to tracking online behavior for a content evaluation system. However, the systems and methods described herein may be used for tracking online behavior for other reasons as well, such as to determine customer use patterns, to determine how to optimize web sites to improve hits or to improve sales.

What is claimed is:

1. A system to provide content for evaluation, the system comprising:
    a treatment generator to generate a treatment including at least one variable component and provide the treatment to a user device visiting a web site;
    a unique ID module running on a computer system to determine attributes of the user device, including a browser attribute, an operating system (OS) attribute, a user profile for a user of the user device, and a physical attribute of the user device, and calculate and store a unique ID for the user from the attributes;

an online behavior capture module to capture online behavior of the user in response to providing the treatment to the user device and to determine whether the unique ID is associated with the captured online behavior, wherein to determine whether the unique ID is associated with the captured online behavior, the online behavior module is to calculate a second unique ID for the captured online behavior from attributes of the user device performing the captured online behavior, and if the second unique ID is the same as the unique ID for the user, associate the unique ID of the user with the captured online behavior; and an online behavior tracker to receive the captured online behavior of the user and the associated unique ID, and to determine whether the associated unique ID matches any stored unique IDs, and upon a determination that the associated unique ID matches any of the stored unique IDs, the online behavior tracker is to store the captured online behavior with the matching stored unique ID.

2. The system of claim 1, further comprising:

a data storage to store the unique IDs and associated captured online behavior, wherein the stored online behavior is received in response to presenting the treatment, including the at least one variable component to different users, and wherein the at least one variable component is varied for the different users.

3. The system of claim 2, further comprising:

an experiment manager to evaluate the stored captured online behavior to determine whether different variations of the at least one variable component influenced the online behavior of the different users.

4. The system of claim 1, wherein the treatment generator is to select a random variation of the at least one variable component to present to the user based on the unique ID of the user.

5. The system of claim 4, wherein the treatment generator is to select the variation by calculating a value using a function having the unique ID as an input and selecting the variation based on the value.

6. The system of claim 1, wherein the online behavior tracker is to determine whether the unique ID matches any stored unique IDs by determining whether the unique ID is within a range of any of the stored unique IDs.

7. The system of claim 1, wherein the online behavior tracker is to determine whether the unique ID matches any stored unique IDs by determining whether the unique ID matches at least a portion of any of the stored unique IDs.

8. The system of claim 1, wherein the unique ID module is to calculate the unique ID for the user by dividing the attributes into groups, calculating a value for each group, and determining the unique ID for the user from the calculated values.

9. The system of claim 1, wherein the unique ID module is to calculate the unique ID for the user by hashing the attributes.

10. An online behavior tracking system comprising:

a unique ID module running on a computer system to determine attributes of a user device, including a browser attribute, an operating system (OS) attribute, a user profile for a user of the user device, and a physical attribute of the user device, and calculate a unique ID for a user from the attributes; and an online behavior tracker to determine whether the unique ID is associated with captured online behavior and to store the captured online behavior with the unique ID in response to a determination that the unique ID is associated with the captured online behavior, wherein to determine whether the unique ID is associated with captured online behavior the online behavior tracker is to calculate a second unique ID for the captured online behavior from attributes of a user device performing the captured online behavior, and determine whether the second ID matches the unique ID calculated by the unique ID module.

11. The online behavior tracking system of claim 10, wherein the to determine whether the second ID matches the unique ID calculated by the unique ID module, the online behavior tracker is to determine whether the second unique ID is within a range including the unique ID calculated by the unique ID module.

12. The online behavior tracking system of claim 10, wherein to determine whether the second ID matches the unique ID calculated by the unique ID module, the online behavior tracker is to determine whether a portion of the unique ID calculated by the unique ID module matches at least a portion of the second unique ID.

13. The online behavior tracking system of claim 10, wherein to calculate the unique ID for the user, the unique ID module is to divide the attributes into groups, calculate a value for each group, and determine the unique ID for the user from the calculated values.

14. The online behavior tracking system of claim 10, wherein to calculate the unique ID for the user, the unique ID module is to hash the attributes.

15. A non-transitory computer readable medium storing one or more computer programs including instructions that when executed by a computer system perform a method of determining a unique ID for an online user, the instructions are to cause the computer system to:

determine attributes of a user device, including a browser attribute, an operating system (OS) attribute, a user profile for a user of the user device, and a physical attribute of the user device;

calculate a unique ID for the user from the attributes; and track the user's visits to websites in different domains, wherein to track the user's visits to websites in different domains, the instructions are to further cause the computer system to:

capture online behavior at a website;

calculate a second unique ID for the captured online behavior from attributes of the user device performing the captured online behavior; and determine whether the second ID matches the unique ID.

16. The computer readable medium of claim 15, wherein to track the user's visits to one or more web sites in different domains, the instructions are to cause the computer system to:

store the unique ID;

store a URL for each of the websites visited by the user and a sequence for accessing each of the websites; and associate the unique ID with each of the stored URLs and the sequence.

17. The computer readable medium of claim 15, wherein to track the user's visits to websites in different domains the instructions are to cause the computer system to:
- hash the attributes of the user device to determine the unique ID;
- determine whether at least a portion of the unique ID matches a stored ID; and
- upon a determination that at least a portion of the unique ID matches the stored ID, store the associated URLs and the sequence with the matching stored ID.

\* \* \* \* \*